(12) United States Patent
Chen et al.

(10) Patent No.: US 12,456,181 B2
(45) Date of Patent: Oct. 28, 2025

(54) METHOD, ELECTRONIC DEVICE, AND COMPUTER PROGRAM PRODUCT FOR VERIFYING VIRTUAL AVATAR

(71) Applicant: Dell Products L.P., Round Rock, TX (US)

(72) Inventors: Si Chen, Shanghai (CN); Zijia Wang, Weifang (CN); Zhenzhen Lin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 18/144,285

(22) Filed: May 8, 2023

(65) Prior Publication Data

US 2024/0346634 A1     Oct. 17, 2024

(30) Foreign Application Priority Data

Apr. 14, 2023 (CN) .......................... 202310402977.5

(51) Int. Cl.
*G06T 7/00* (2017.01)

(52) U.S. Cl.
CPC .. *G06T 7/0002* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2017/0061198 A1* | 3/2017 | Choi | G06T 7/73 |
| 2019/0272412 A1* | 9/2019 | Dandekar | G06V 10/77 |
| 2022/0245926 A1* | 8/2022 | Huang | G06V 40/103 |
| 2023/0222628 A1* | 7/2023 | Zhao | G06V 40/168 |
| | | | 382/156 |
| 2023/0289817 A1* | 9/2023 | Ashby | H04L 9/3271 |
| 2024/0177439 A1* | 5/2024 | Shirai | G06T 19/20 |

OTHER PUBLICATIONS (Yampolskiy, Roman V., et al. "Evaluation of face recognition algorithms on avatar face datasets." 2011 International Conference on Cyberworlds. IEEE, 2011.) (Year: 2011).*
D. Yi et al., "Learning Face Representation from Scratch," arXiv:1411.7923v1, Nov. 28, 2014, 9 pages.
Metamask, "A Crypto Wallet & Gateway to Blockchain Apps," https://metamask.io/, Accessed Mar. 8, 2023, 9 pages.

* cited by examiner

*Primary Examiner* — Devona E Faulk
*Assistant Examiner* — Dan F Kalhori
(74) *Attorney, Agent, or Firm* — Ryan, Mason & Lewis, LLP (57) ABSTRACT

Embodiments of the present disclosure relate to a method, an electronic device, and a computer program product for verifying a virtual avatar. The method includes: determining, based on the virtual avatar and a plurality of reference images in an image library, a first similarity set comprising a plurality of similarities between the virtual avatar and the plurality of reference images; and selecting a plurality of candidate images from the plurality of reference images based on the first similarity set and a predetermined number. The method further includes: determining a second similarity set comprising a plurality of similarities between the virtual avatar and the plurality of candidate images; and determining a verification result for the virtual avatar based on a subset in the first similarity set that is associated with the plurality of candidate images, and the second similarity set.

20 Claims, 7 Drawing Sheets

METHOD, ELECTRONIC DEVICE, AND COMPUTER PROGRAM PRODUCT FOR VERIFYING VIRTUAL AVATAR

RELATED APPLICATION

The present application claims priority to Chinese Patent Application No. 202310402977.5, filed Apr. 14, 2023, and entitled "Method, Electronic Device, and Computer Program Product for Verifying Virtual Avatar," which is incorporated by reference herein in its entirety.

FIELD

Embodiments of the present disclosure relate to the field of computers, and more particularly, to a method, an electronic device, and a computer program product for verifying a virtual avatar.

BACKGROUND

With the development of augmented reality/virtual reality (AR/VR), human beings and digital technologies are approaching each other both conceptually and physically. This progress can be easily observed from various ways in which digital media reshape the human body, no matter whether it is an image shared online through social media platforms, mobile technologies, or in any other way. In virtual worlds (e.g., online games or other virtual worlds), users use generated virtual avatars to represent themselves. The virtual avatars are digital representations of interactive, social, and even concurrent activities in the virtual worlds.

SUMMARY

Embodiments of the present disclosure provide a method, an electronic device, and a computer program product for verifying a virtual avatar.

According to a first aspect of the present disclosure, a method for verifying a virtual avatar is provided. The method includes: determining, based on the virtual avatar and a plurality of reference images in an image library, a first similarity set comprising a plurality of similarities between the virtual avatar and the plurality of reference images. The method further includes: selecting a plurality of candidate images from the plurality of reference images based on the first similarity set and a predetermined number. The method further includes: determining a second similarity set comprising a plurality of similarities between the virtual avatar and the plurality of candidate images. The method further includes: determining a verification result for the virtual avatar based on a subset in the first similarity set that is associated with the plurality of candidate images, and the second similarity set.

According to a second aspect of the present disclosure, an electronic device is provided. The electronic device includes a processor and a memory coupled to the processor, wherein the memory has instructions stored therein, and the instructions, when executed by the processor, cause the electronic device to execute actions. The actions include: determining, based on a virtual avatar and a plurality of reference images in an image library, a first similarity set comprising a plurality of similarities between the virtual avatar and the plurality of reference images. The actions further include: selecting a plurality of candidate images from the plurality of reference images based on the first similarity set and a predetermined number. The actions further include: determining a second similarity set comprising a plurality of similarities between the virtual avatar and the plurality of candidate images. The actions further include: determining a verification result for the virtual avatar based on a subset in the first similarity set that is associated with the plurality of candidate images, and the second similarity set.

According to a third aspect of the present disclosure, a computer program product is provided, wherein the computer program product is tangibly stored on a non-transitory computer-readable medium and includes computer-executable instructions, and the computer-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

As discussed above, in a virtual world, anyone can digitally express himself or herself in a personalized manner by utilizing a virtual avatar. In addition, virtual avatars or virtual profile photos are becoming important digital virtual assets for individuals, as participants in virtual worlds can design and customize their profile photos and even monetize their profile photos. Therefore, how to protect virtual images from theft, spoofing, and other attacks has become a focus of attention. In addition, the non-fungible token (NFT) is an emerging technology that can be a fundamental part of building a financial ecosystem for virtual worlds. NFTs are digital assets that represent Internet collectibles, such as art, music, and games, and have authenticity certificates created by the blockchain technologies that underpin cryptocurrencies. The NFT technology is an effective technique for securing ownership of people's virtual avatars.

Therefore, with respect to how to protect virtual assets such as virtual avatars from theft, the present disclosure provides a new method for image protection traceability acquisition in a virtual world. In embodiments of the present disclosure, features are first extracted from self-portraits or profile photos, and then vectors are generated for training a discriminator to determine whether the images are unique. In order to protect the ownership of these self-portraits or profile photos and the extracted features, the images as well as the extracted features are bound to the accounts of participants, such as digital wallets, using NFT techniques. The overall process of illustrative embodiments of the present disclosure includes, for example, a feature extraction component for extracting feature self-portraits therefrom, and a judgment component for a discriminator to verify whether the ownership of a self-portrait uploaded is valid.

Therefore, with this method, the traceability of the virtual avatar of an individual can be obtained and the ownership of the virtual avatar of the individual can be protected to a certain extent. It can be understood that the present disclosure will use virtual avatars, profile photos, user images, and virtual images interchangeably for ease of description.

Figure 1A:
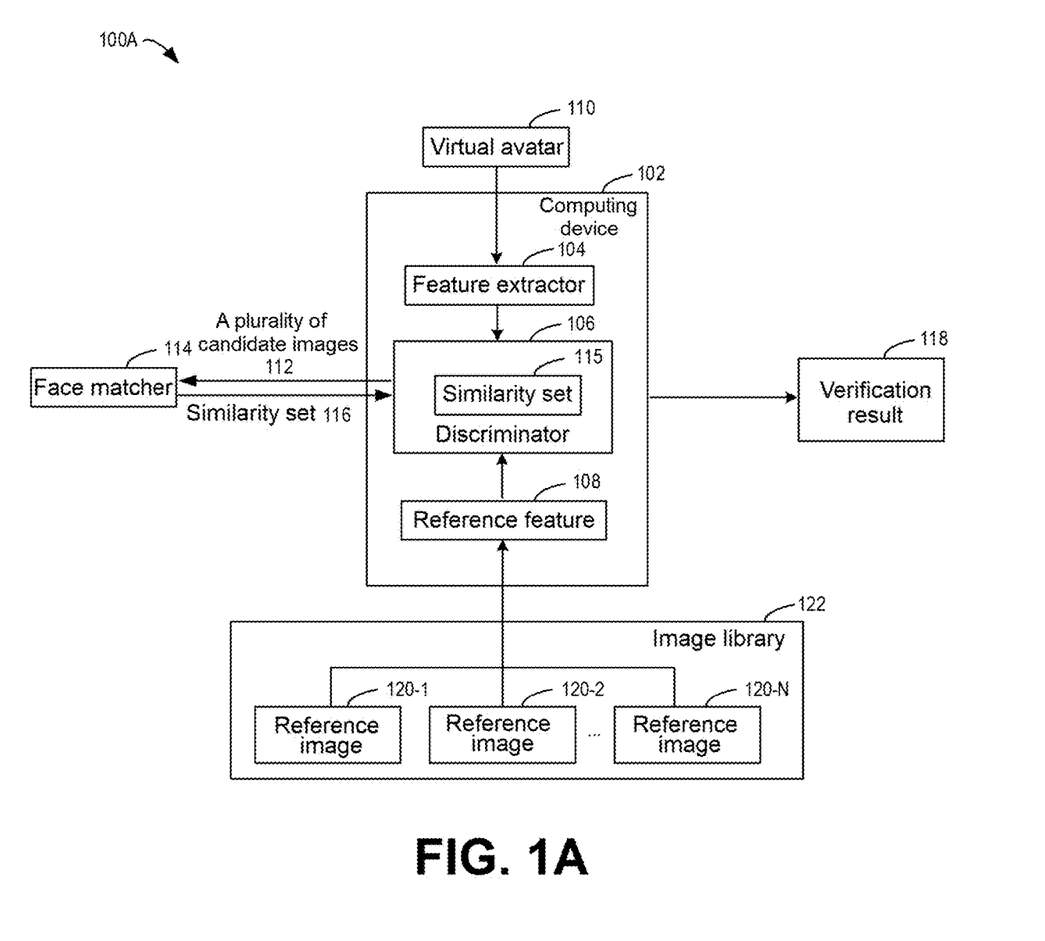
FIG. 1A is a schematic diagram of an example environment in which embodiments of the present disclosure can be implemented.

FIG. 1A is a schematic diagram of an example environment 100A in which embodiments of the present disclosure can be implemented. As shown in FIG. 1A, the example environment 100A may include a computing device 102. The computing device 102 is capable of acquiring a virtual avatar 110. As an example, the virtual avatar 110 is generally acquired in the form of an image (e.g., a self-portrait). The example environment 100A may also include a reference image 120-1, a reference image 120-2, . . . , a reference image 120-N, and so on (individually or collectively referred to as reference images 120). The reference images 120 may be stored in an image library 122. The image library 122 may be a software product for managing images, or a hardware device.

The computing device 102 can acquire the virtual avatar 110 and the reference images 120. The virtual avatar 110 may be input to a feature extractor 104. The feature extractor 104 extracts or crops facial features from the virtual avatar 110 into a size suitable for subsequent processing (e.g., 100 pixels by 100 pixels). The feature extractor 104 further generates a feature representation of the virtual avatar 110 based on the facial region of the virtual avatar 110.

The feature representation of the virtual avatar 110 may be input to a discriminator 106. The discriminator 106 may also acquire N reference features 108 (or collectively referred to as reference features 108) of the N reference images 120. The N reference features 108 may be generated in advance by a similar process, and may be stored in a storage apparatus. The discriminator 106 may calculate N similarities between each of the reference images and the virtual avatar 110 according to the feature representation of the virtual avatar 110 and the reference features 108 of the N reference images 120, and select K reference images similar to the virtual avatar 110 based on a similarity set 115 (also referred to as a first similarity set) that includes N similarities (where N and K are integers, and K is smaller than N), and these reference images selected may be collectively referred to as a plurality of candidate images 112.

The plurality of candidate images 112 may be input to a predetermined face matcher 114, for example, a commercial off-the-shelf (COTS) face matcher, which is more generally referred to herein as simply a COTS matcher. Based on the plurality of candidate images 112, the face matcher 114 may generate a similarity between each candidate image of the plurality of candidate images 112 and the virtual avatar 110 based on each candidate image of the plurality of candidate images 112 and the virtual avatar 110. Therefore, for the plurality of candidate images 112, a similarity set 116 (also referred to as a second similarity set) can be obtained. The discriminator 106 may acquire the similarity set 116. The discriminator 106 may determine a verification result 118 for the virtual avatar 110 based on a plurality of similarities for the plurality of candidate images 112 in the first similarity set and the similarity set 116.

It should be understood that the architecture and functionality in the example environment 100A are described for exemplary purposes only and do not imply any limitation to the scope of the present disclosure. Embodiments of the present disclosure may also be applied to other environments having different structures and/or functions.

Figure 1B:
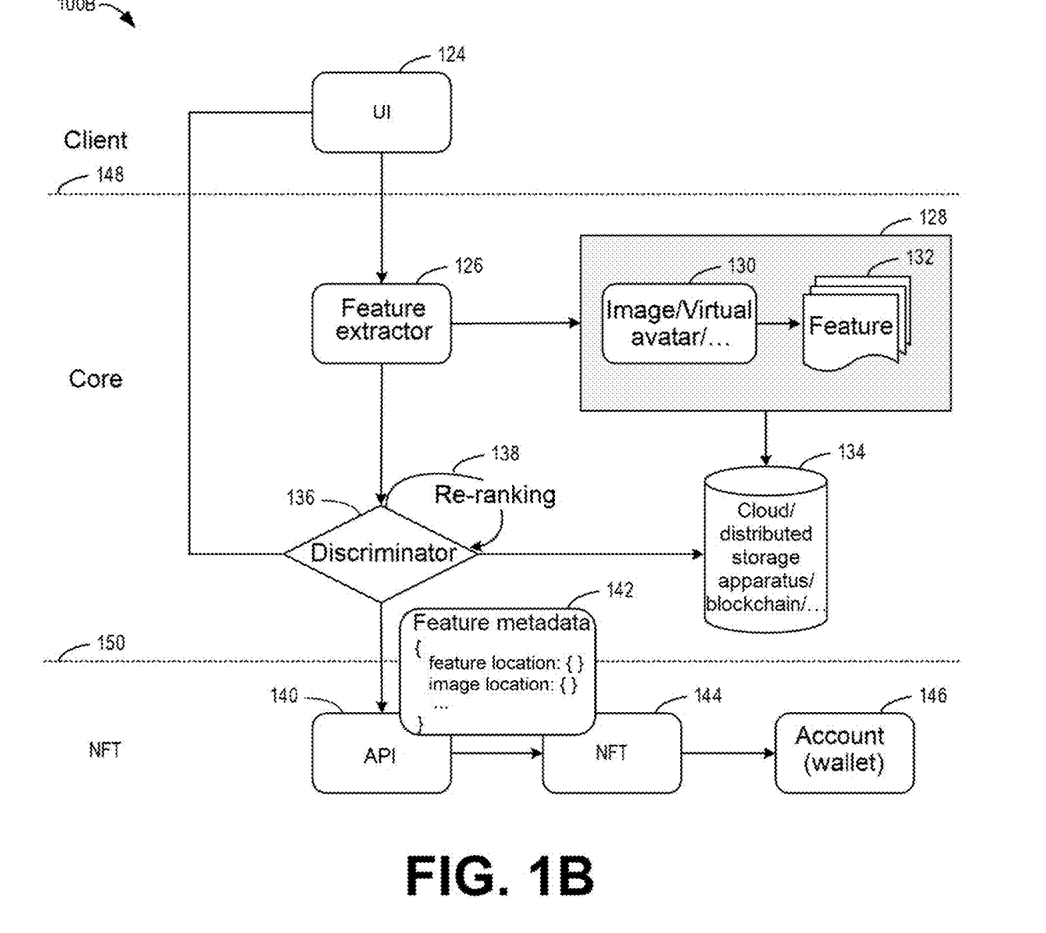
FIG. 1B is a schematic diagram of an overall architecture of embodiments of the present disclosure.

FIG. 1B is a schematic diagram of an overall architecture 100B of embodiments of the present disclosure. The overall architecture 100B illustrates a high-level architecture for protecting the ownership of personal profile photos and providing the traceability for personal profile photos. At a high level, as shown in FIG. 1B, as a core, this architecture includes a feature extractor 126 for extracting features from images; and a discriminator 136 for formulating face filters to find the most similar face in the image library so as to verify the ownership of a probe image (e.g., the virtual avatar 110). In some embodiments, it is also possible to provide the result of ranking. With ownership and uniqueness authentication, metadata for the images will be constructed. Based on the metadata, a non-fungible token will be created and saved in a personal account, as in a wallet supported by a decentralized application.

As shown in FIG. 1B, the client part is illustrated above the dashed line 148. For example, the user uploads a virtual avatar through a user interface (UI) 124. The core part of embodiments of the present disclosure is illustrated between the dashed line 148 and the dashed line 150. For example, the feature extractor 126 receives from the UI 124 the virtual avatar uploaded by the user. Reference can be made to block 128 for the detailed process of the feature extractor 126. In block 128, a virtual avatar 130 acquired by the feature extractor 126 may be converted to target features 132. The target features 132 may be stored in a storage apparatus 134. The storage apparatus 134 may be a cloud storage apparatus, a distributed storage apparatus, a blockchain, and the like. During the pre-training phase, reference images from the image library may also be used to generate reference features via the feature extractor 126 and be stored in the storage apparatus 134. This can improve the efficiency of verifying the virtual avatar.

The discriminator 136 can acquire the target features 132 and the reference features and use, for example, a K-nearest neighbor (K-NN) algorithm to find K candidate images in the image library that have the top similarities to the virtual avatar 130. The discriminator 136 may also re-rank 138 the candidate images based on the similarities from the COTS face matcher. After the re-ranking 138, it can be determined whether there is a candidate image having a similarity to the virtual avatar 130 that is greater than a threshold value. If there exists such a candidate image, it indicates that the virtual avatar 130 uploaded by the user may not be unique, and thus the user may be alerted. If there exists no such candidate image, it indicates that the virtual avatar 130 uploaded by the user is unique (or that the likelihood of being unique is high). The NFT part is illustrated below the dashed line 150. If the virtual avatar 130 uploaded by the user is unique, feature metadata 142 for the virtual avatar 130 can be generated via the Application Programming Interface (API) 140 of the NFT. Based on the feature metadata 142, an NFT 144 can be generated and can further be used for an account (wallet) 146, and so on.

Figure 2:
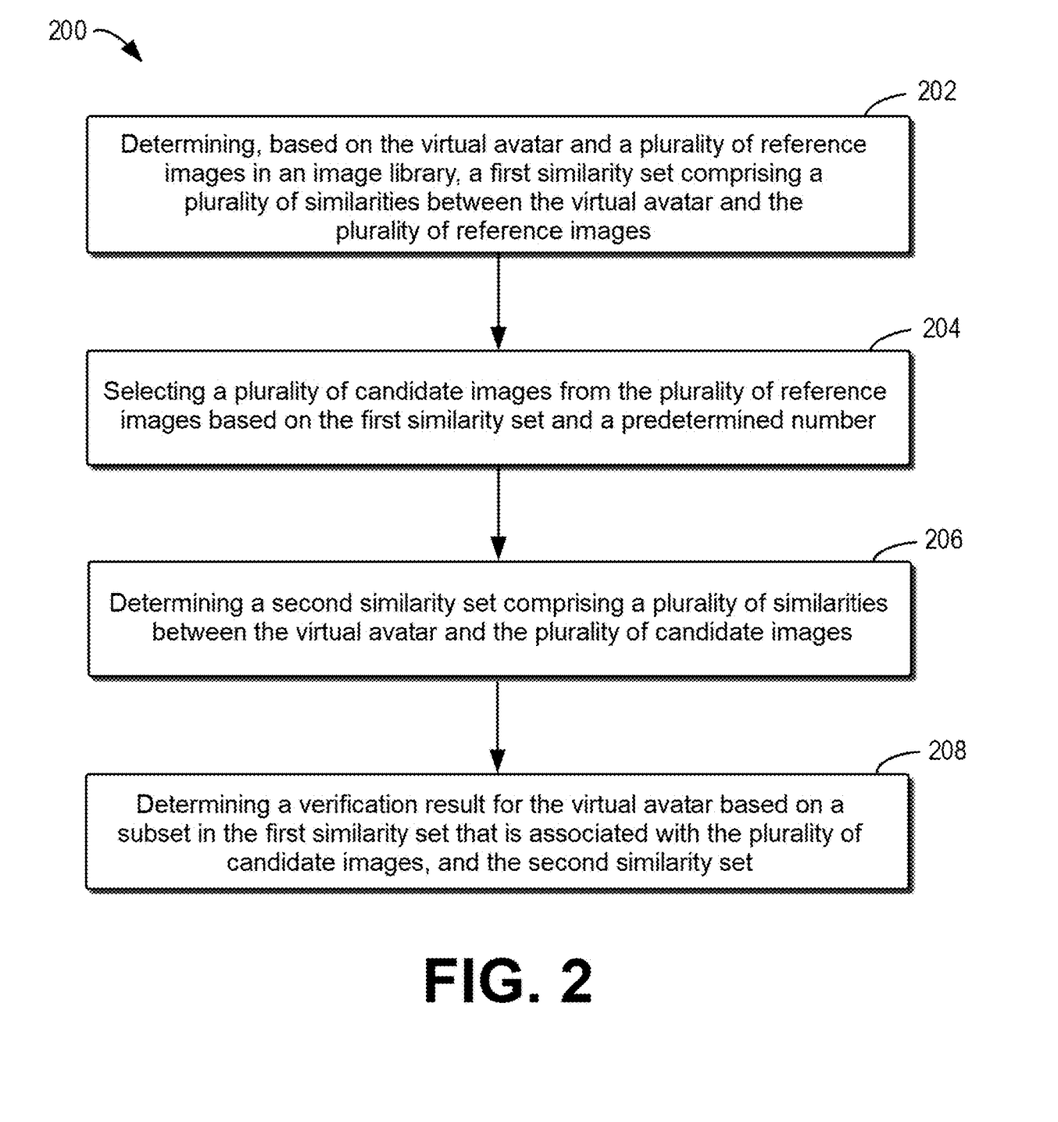
FIG. 2 is a flow chart of a method for verifying a virtual avatar according to an illustrative embodiment of the present disclosure.

A process according to embodiments of the present disclosure will be described in detail below with reference to FIG. 2 to FIG. 5. For the convenience of understanding, specific data mentioned in the following description is exemplary and is not intended to limit the protection scope of the present disclosure. It should be understood that the embodiments described below may also include additional actions not shown and/or may omit actions shown, and the scope of the present disclosure is not limited in this regard. FIG. 2 is a flow chart of a method 200 for verifying a virtual avatar according to an illustrative embodiment of the present disclosure.

Figure 3:
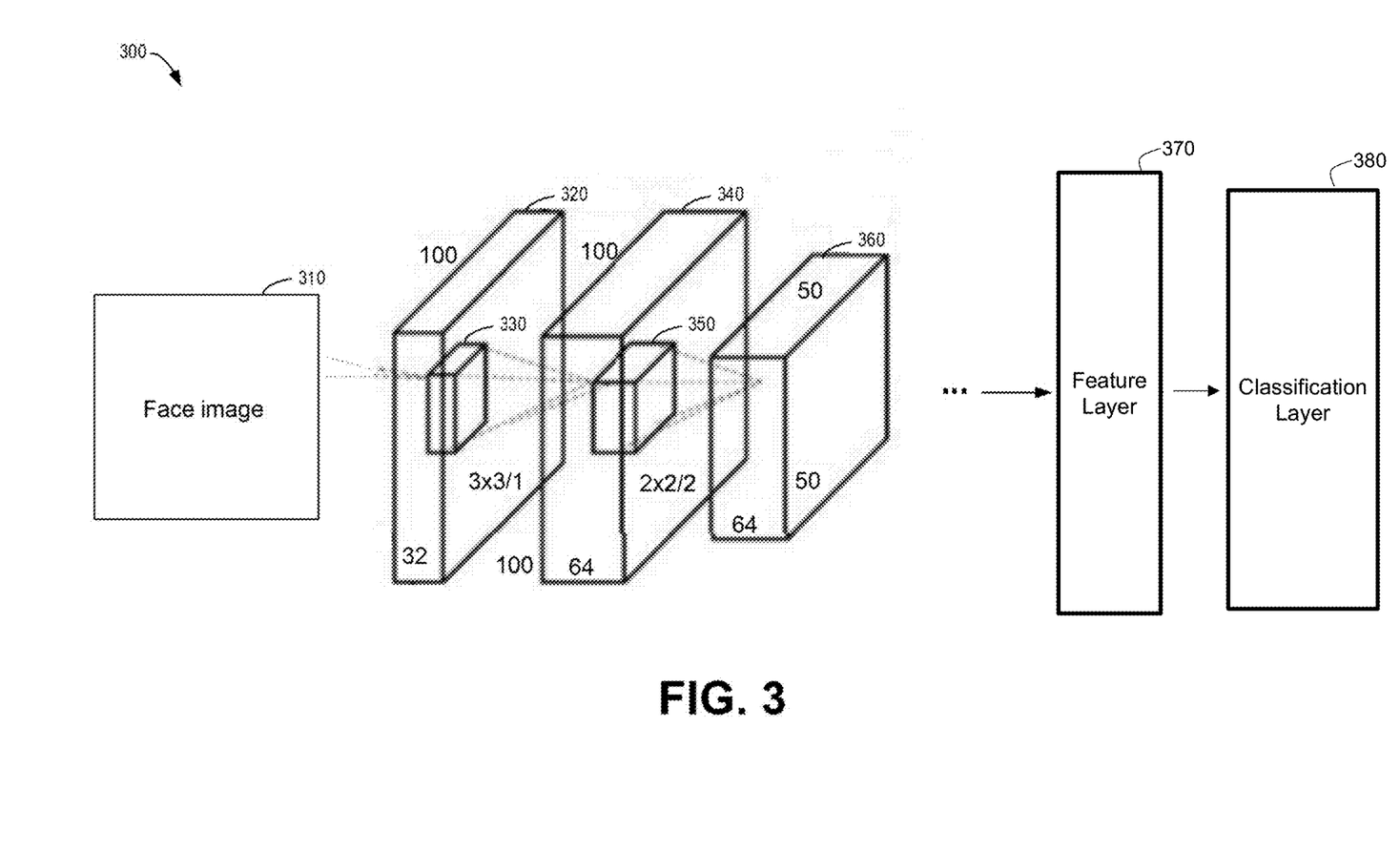
FIG. 3 is a schematic diagram of a feature extractor according to an illustrative embodiment of the present disclosure.

At block 202, based on the virtual avatar and a plurality of reference images in an image library, a first similarity set comprising a plurality of similarities between the virtual avatar and the plurality of reference images is determined. As an example, how to extract image features will be illustrated below in conjunction with FIG. 3 using any image as an example. FIG. 3 is a schematic diagram of a feature extractor 300 according to an illustrative embodiment of the present disclosure. As shown in FIG. 3, for any given image 310 and where the image 310 includes a face, the feature extractor 300 may be a nonlinear function, such as the function shown in Equation (1) below:

$$\mathcal{F}(I) = x \in \mathbb{R}^d \tag{1}$$

where I denotes an image to be processed, $\mathbb{R}^d$ denotes a d-dimensional space, x denotes an extracted feature vector, and $\mathcal{F}$ denotes the operator for feature extraction.

The feature extractor 300 projects the image into the d-dimensional feature space. Given the advanced performance of deep learning methods in a variety of machine learning applications, including face recognition, the feature extractor 300 can use a deep learning model to extract features.

Unlike conventional deep learning models, the feature extractor 300 has some characteristics of its own. In one characteristic, the input to the deep learning model is a color image rather than a gray scale image. In another characteristic, the deep learning model uses a robust face alignment method. The feature extractor 300 also has an additional data validation step, for example, randomly cropping a 100×100 pixel area from a 110×110 pixel input color image and then performing a horizontal reflection to generate additional images to train the network. The feature extractor 300 will not use contrastive cost layers, so as to improve the efficiency of computation.

For example, the image 310 may be input to the convolutional layer 320. To simplify the schematic diagram, not all convolutional layers are shown, for example, there can be a total of 10 convolutional layers. The convolutional layers may use a small filter (e.g., a 3*3 filter) 330. The small filter size reduces the total number of parameters to be learned to the maximum extent possible. The output of the feature extractor 300 may be a 320-dimensional feature vector.

In some embodiments, the feature extractor 300 may have ten convolutional layers, four max pooling layers, and one average pooling layer. Each pair of convolutional layers is grouped and linked sequentially. The first four groups of convolutional layers are followed by one max pooling layer with a 2*2 filter 350 and a stride of 2, while the last group of convolutional layers is followed by one average pooling layer with a 7*7 filter. For example, the convolution layer 320, the convolution layer 340, and the pooling layer 360 may be one group. In some embodiments, the dimensionality of a layer representing features is equal to the number of filters in the final convolutional layer.

In some embodiments, a rectified linear unit (ReLU) node of the activation function of the feature extractor 300 is used for all convolutional layers except the final layer, which is merged with the average pooling layer to provide a 320-dimensional face representation. The face representation will be input to a feature layer 370. The deep features created by the feature layer 370 are input directly to a classification layer 380, which can output a classification result for the image.

In some embodiments, a portion of the data may be used selectively (e.g., using a dropout technique), for example, the feature layer 370 may be normalized by keeping 60% of the feature components unchanged and randomly setting the remaining 40% to zero throughout the training process. In some embodiments, a softmax loss function can be used, and training can be performed using back propagation techniques. In some embodiments, a weight decay value of $5*10^{-4}$ may be used. The initialization is $10^{-2}$, and the learning rate of stochastic gradient descent (SGD) is gradually reduced to $10^{-5}$.

Figure 4:
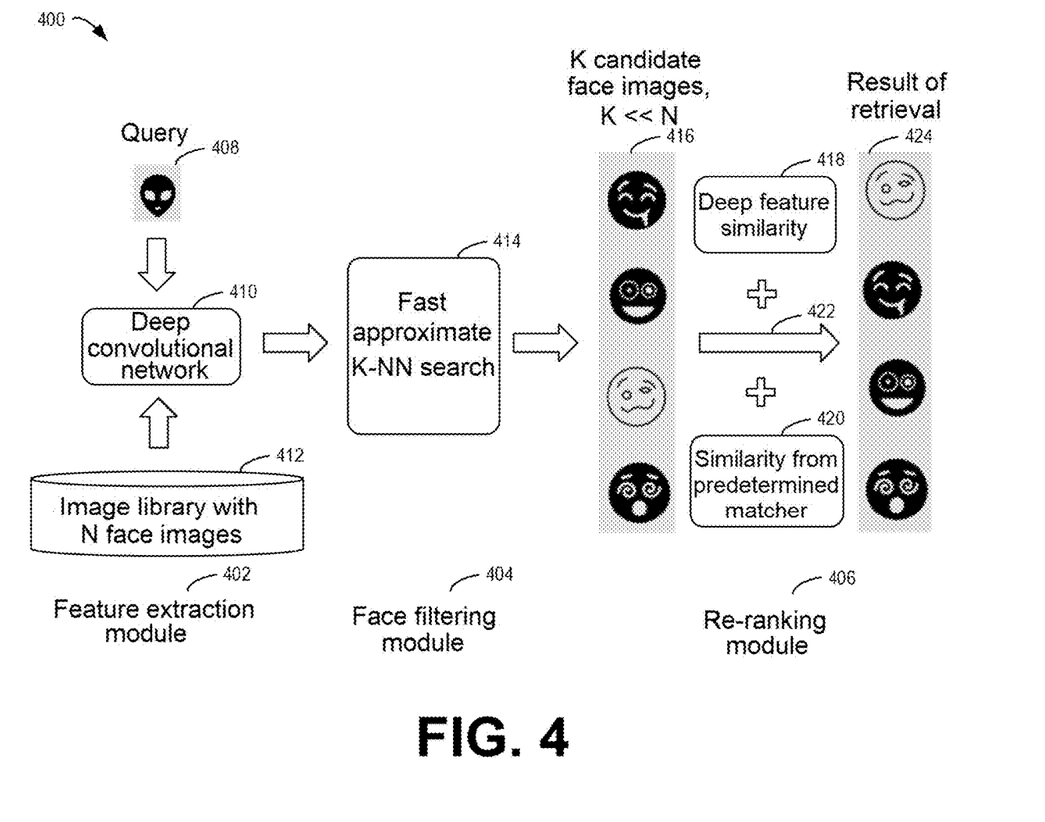
FIG. 4 is a schematic diagram of an overall architecture of a discriminator according to an illustrative embodiment of the present disclosure.

Returning now to FIG. 2, at block 204, a plurality of candidate images are selected from the plurality of reference images based on the first similarity set and a predetermined number. Block 204 may be performed in a discriminator as shown in FIG. 4. As an example, the architecture of the discriminator will be illustrated below in conjunction with FIG. 4. FIG. 4 is a schematic diagram of an overall architecture of a discriminator 400 according to an illustrative embodiment of the present disclosure. The discriminator 400 may include three processes, which are a feature extraction module 402, a face filtering module 404, and a re-ranking module 406, respectively.

For the discriminator 400, a new profile photo is acquired to function as a query profile photo 408. The goal of the discriminator 400 may be to find the most similar face image in the image library, and if no face is found, it can be considered as a new profile photo, and then added to the profile photo pool to become a new asset. In order to handle a large image library containing tens of millions of images, illustrative embodiments of the present disclosure provide a cascading face search structure that can speed up the search process while achieving acceptable accuracy.

In some embodiments, the feature extraction module 402 extracts features for an image library 412 with N images (offline) and for probe faces (online). The feature extraction process of the feature extraction module 402 can be understood with reference to FIG. 3. For example, a deep convolutional network 410 is utilized to extract features. In some embodiments, the discriminator 400 may also include the feature extractor 300.

In some embodiments, the face filtering module 404 may use product quantization to compare a probe face with face representations in the image library to retrieve the most similar k candidate faces (k≪N). Given a probe face I and a template generation function $\mathcal{F}$, the top k most similar faces $C_k(I)$ in the image library G can be found using Equation (2) below:

$$C_k(I) = \text{Rank}_k(\{S(\mathcal{F}(I), \mathcal{F}(J_i)) \mid J_{i=1,2,\ldots,N} \in G\}) \quad (2)$$

where N denotes the size of the image library G, for example, the number of images, $\mathcal{S}$ denotes a function measuring the similarity, which is used to calculate the probe face I and image $J_i$, and Rank(·) is a function for finding the top k similar face images in the image library G. Since the computational complexity of the face comparison function is linearly related to the image library size N and the feature dimension d, in order to solve the large-scale search problem, a fast approximate K-NN search algorithm 414 can also be used, so that the running time can be improved without significantly reducing the accuracy.

In some embodiments, algorithms for product quantization may also be used, where the feature template space is decomposed into a Cartesian product of lower dimensional sub-spaces (each sub-space is quantized separately), so that desired search results can be achieved. In product quantization, it is assumed that the feature dimension is a multiple of m, where m is an integer, and any feature vector $x \in \mathbb{R}^d$ can be written in the form of a series of m sub-vectors $(x^1, x^2, \ldots, x^m)$, each with a dimension of d/m. In the ith subspace $\mathbb{R}^{d/m}$, if a sub-codebook $\mathcal{C}^i = \{c_{j=1,\ 2},\ \ldots,\ z^i | c_j^i \in \mathbb{R}^{d/m}\}$ is given, where z denotes the size of the codebook, the sub-vector $x^i$ can be mapped to the codeword $c_j^i$ in the codebook $\mathcal{C}^i$, where j denotes an index value. In some embodiments, the index j may be represented with a $\log_2(z)$-bit binary code. Each codebook may be generated using a K-means clustering algorithm. Given all m sub-codebooks $\{\mathcal{C}^1, \mathcal{C}^2, \ldots, \mathcal{C}^m\}$, the product quantization of the template feature x can be expressed by Equation (3):

$$q(x) = (q^1(x^1), \ldots, q^m(x^m)) \quad (3)$$

where $q^j(x^j) \in \mathcal{C}^j$ denotes the nearest sub-centroid of the sub-vector $x^j$ in $\mathcal{C}^j$ and j=1, 2, . . . , m; and the quantizer q(x) may have m $\log_2(z)$ bits. In some embodiments, given another feature template y, the asymmetric squared Euclidean distance between x and y can be approximated by Equation (4):

$$\mathcal{D}(y, x) = \|y - q(x)\|^2 = \sum_{j=1}^{m} \|y^j - q^j(x^j)\|^2 \quad (4)$$

where $q^j(x^j) \in \mathcal{C}^j$, and the distance $\|y^j - q^j(x^j)\|$ can be computed in advance for the sub-vector of each $y^j$, j=1, 2, . . . , m and for each sub-centroid in $\mathcal{C}^j$, j=1, 2, . . . m. Since distance computation utilizes lookup and add operations with complexity O(m), the approximate nearest neighbor search using a product quantizer is fast, and the use of binary encoding significantly reduces the requirements for the memory. If no additional hashing scheme is used, this method has complexity O(N), N being the size of the dataset.

In some embodiments, in order to further reduce the search time, the present disclosure further provides a non-exhaustive search scheme based on an inverted file system and a coarse quantizer. Based on the coarse quantizer, the query image is compared with only a part of the image library. However, non-exhaustive search significantly degrades the performance of face search when used together with feature vectors. Two important parameters in product quantization are the number of sub-vectors m and the size of the sub-codebook z, which together determine the length m $\log_2 z$ of the quantized code. In general, z can be set to 256. To find the optimal m, the present disclosure evaluates empirically the search accuracy and the time per query for different m values based on an image library of 1 million faces and over 3000 queries. When the length of the quantized code exceeds 512 bits (m=64), the performance gap between product quantization and strong search becomes smaller. Considering the search time, the approximate search based on product quantization is at least one order of magnitude faster than the normal search. As a trade-off between the efficiency and the effectiveness, the number of sub-vectors m can be set to 64, so the quantized code can have a length of 64 $\log_2(256)$=512 bits.

Although product quantization can be used in the present disclosure to calculate the face similarity score, a distance or similarity metric can additionally or alternatively be chosen. A cosine similarity, an L1 distance, and an L2 distance are evaluated using an image library of 5 million images. In some embodiments, the cosine similarity achieves the best performance among these three metrics, although the normalized L2 distance has the same performance.

In this way, with the face filtering module 404, K candidate images have been acquired from the N images. Returning now to FIG. 2, at block 206, a second similarity set comprising a plurality of similarities between the virtual avatar and the plurality of candidate images is determined. As an example, the second similarity set may be generated by a COTS matcher. Block 206 may be performed in the re-ranking module 406 of the discriminator 400. The re-ranking module 406 continues to be described below in conjunction with FIG. 4. The optimal candidate set size K is linearly proportional to the image library size N.

In the re-ranking module 406, a plurality of candidate images 416 may be acquired from the face filtering module 404. The re-ranking module 406 also acquires a deep feature similarity 418 from the feature extraction module 402 that is generated via a deep learning model. The re-ranking module 406 also acquires a similarity 420 from a predetermined matcher (e.g., a COTS matcher). The re-ranking module 406 may merge 422 the deep feature similarity 418 (referred to as DF) and the similarity 420 from the predetermined matcher (e.g., a COTS matcher) to obtain a plurality of similarities 424 as merged (also referred to as a third similarity set).

In some embodiments, the following fusion strategies can be used individually or in parallel, or two or more of the following fusion strategies can be used in combination. In fusion strategy (1), the similarity scores can be merged based on the DF feature and the COTS matcher without any filtering. In fusion strategy (2), the image library is filtered using DF features, and then the list of candidates are re-ranked based on the fusion of DF features and similarity scores of the COTS matcher. In fusion strategy (3), only the similarity score of the COTS matcher is used to rank the K candidate images of the DF feature output. In fusion strategy (4), DF features are used to filter the image library, and the similarity scores of the DF features and the COTS matcher are used to separately rank the K candidate images. Finally, the two ranking lists are merged, for example, by taking the intersection of the two ranking lists. This is useful when the COTS matcher does not report similarity scores.

To make the evaluation easy to handle, different fusion strategies are evaluated using about 3000 probe faces and a library of 1 million faces. As a baseline, the retrieval performance using DF and COTS matcher alone is also tested. Fusion strategy (2) outperforms other fusion methods and also outperforms only the use of DF and COTS matcher alone. The accuracy of the similarity between the re-ranked candidate images and the virtual avatar is high, and therefore the confidence level of the obtained retrieval result comprising the similarities 424 is also high.

Returning now to FIG. 2, at block 208, a verification result for the virtual avatar is determined based on a subset in the first similarity set that is associated with the plurality of candidate images, and the second similarity set. As an example, the first similarity set may have N similarities, where N denotes the number of images in the image library. Among the N similarities, a plurality of similarities corresponding to the plurality of candidate images 112 are selected as a subset. Based on the selected subset and the second similarity set, the verification result 118 for the virtual avatar 110 is determined.

The verification result 118 can be considered abnormal if there exists an image with similarity exceeding a threshold value among the re-ranked candidate images. The verification result 118 can be considered normal if there exists no image with similarity exceeding a threshold value among the re-ranked candidate images. If the verification result 118 of verifying the virtual avatar 110 is normal, a non-fungible token for the virtual avatar is generated for use as a virtual asset of the user. If the verification result 118 of verifying the virtual avatar 110 is abnormal, the user is alerted that the virtual avatar 110 may not be unique, i.e., there may be a risk of misappropriation by others.

In this way, by implementing the method 200, the associated risk can be easily detected when a face image or self-portrait is misappropriated, for example, by an attacker for malicious activities, thereby enabling verification and acknowledgment of feature image ownership and thus tracking the use of the face image.

Figure 5:
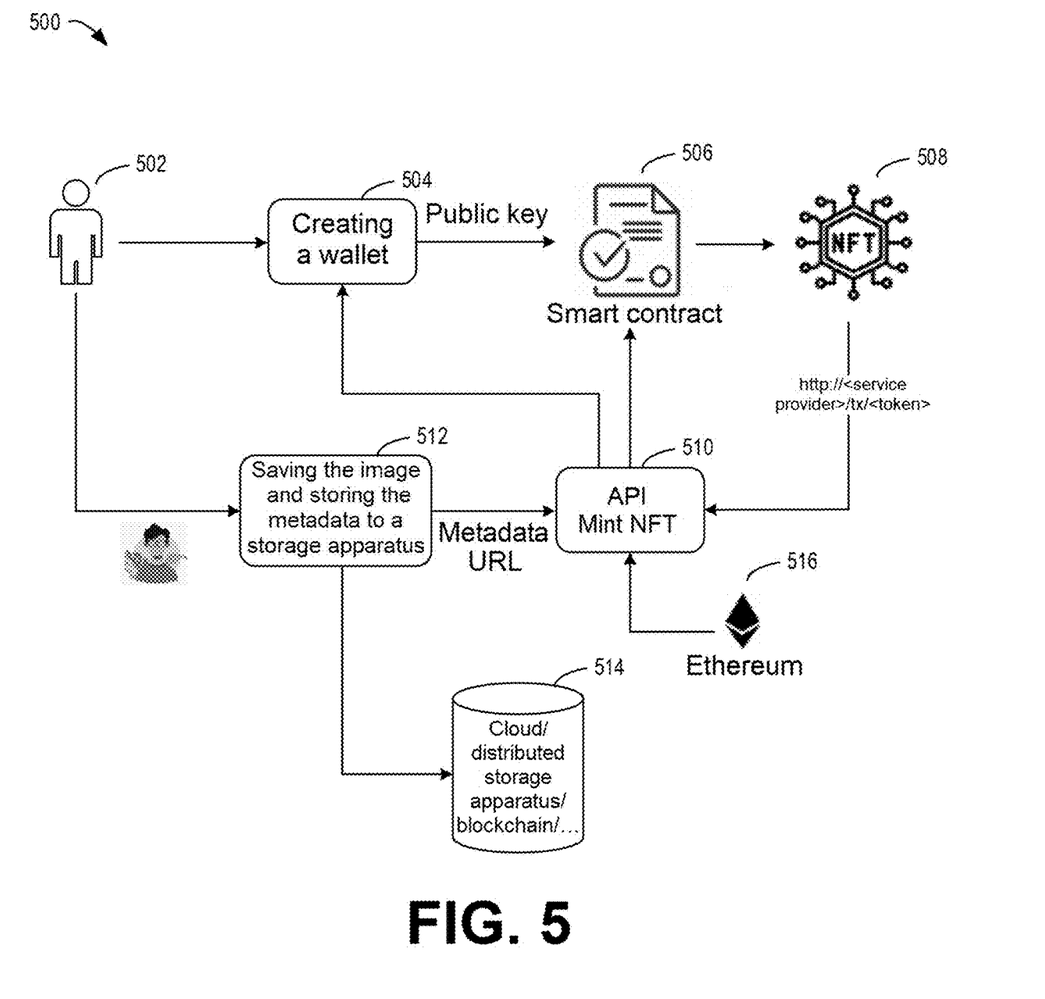
FIG. 5 is a schematic diagram of a process for image ownership protection using non-fungible token technologies according to an illustrative embodiment of the present disclosure.

FIG. 5 is a schematic diagram of a process 500 for image ownership protection using non-fungible token technology according to an illustrative embodiment of the present disclosure. FIG. 5 illustrates the process of protecting the ownership of a given unique image that has been verified by a discriminator.

As an example, the method of the present disclosure can be configured as a generic module that provides traceability to images for activities such as transaction authentication and legal traceability. For example, if others use their own self-portraits to register for accounts or generate their profile photos in an online gaming platform, the method 200 of the present disclosure can be integrated to verify the ownership of the self-portraits and provide a reason for the application to block registration.

At a high level, the workflow of the ownership protection module has the following steps. A user 502 creates a specific account for owning and saving the virtual asset NFT. Considering the ecology of the NFT, the account may be a digital wallet provided by a decentralized application. At 504, the user may create a wallet.

At 512, the user 502 may save the image that serves as his or her virtual avatar, which may be stored, for example, in a specific storage apparatus 514, for example, cloud storage, or even blockchain, and the like. At 512, metadata may also be created. The metadata is used to mint an NFT 508 via an API 510 through a metadata URL. The metadata may also be stored in storage apparatus 514 such as a cloud storage apparatus, an IPFS (interplanetary file system), and so on.

In some embodiments, the format of the metadata may be as follows:

```
Metadata
{
    Image location: {storage service, file service, IPFS, cloud, ...}
    Feature location: {...}
}
```

With the API 510, it is also possible to implement a smart contract 506. Given a metadata location URL and a public key account in the wallet, an API for minting an NFT, e.g., the API 510, can be invoked. After the NFT is minted, other functions in the virtual world can also be implemented, and access to an Ethereum system 516 can be further achieved.

By implementing embodiments of the present disclosure, it is possible to check the uniqueness of images and develop a more effective and accurate image discriminative ranking method based on an image feature extraction method and using a deep learning method. Using a decentralization technology, such as an NFT technology and a DAPP (decentralization application), personal images can be used as virtual assets and connected to personal accounts. As a result, the ownership and traceability can be obtained. In addition, the overall architecture of the present disclosure is a generic module or pattern that provides traceability to images for applications such as transaction authentication and legal traceability or platforms such as online games.

Figure 6:
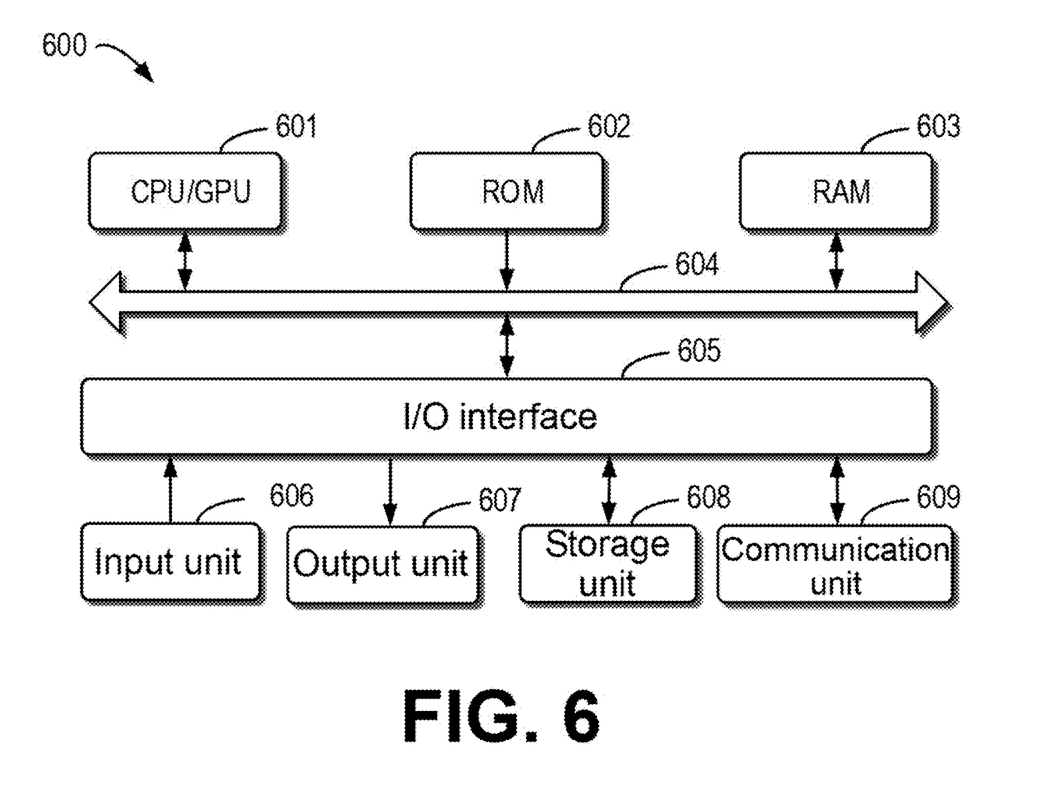
FIG. 6 is a block diagram of a device for verifying a virtual avatar according to an illustrative embodiment of the present disclosure.

FIG. 6 is a block diagram of a device 600 that may be used to implement embodiments of the present disclosure. The device 600 may be a device or apparatus as described in embodiments of the present disclosure. As shown in FIG. 6, the device 600 includes a central processing unit and/or graphics processing unit (CPU/GPU) 601 that may perform various appropriate actions and processing according to computer program instructions stored in a read-only memory (ROM) 602 or computer program instructions loaded from a storage unit 608 into a random access memory (RAM) 603. In the RAM 603, various programs and data required for the operation of the device 600 may also be stored. The CPU/GPU 601, the ROM 602, and the RAM 603 are connected to each other through a bus 604. An input/ output (I/O) interface 605 is also connected to the bus 604. Although not shown in FIG. 6, the device 600 may also include a co-processor.

A plurality of components in the device 600 are connected to the I/O interface 605, including: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be executed by the CPU/GPU 601. For example, in some embodiments, the methods can be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded into the RAM 603 and executed by the CPU/GPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Various embodiments of the present disclosure have been described above. The foregoing description is illustrative rather than exhaustive, and is not limited to the embodiments disclosed. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for verifying a virtual avatar, comprising:
   determining, based on the virtual avatar and a plurality of reference images in an image library, a first similarity set comprising a plurality of similarities between the virtual avatar and the plurality of reference images;
   selecting a plurality of candidate images from the plurality of reference images based on the first similarity set and a predetermined number;
   determining a second similarity set comprising a plurality of similarities between the virtual avatar and the plurality of candidate images;
   determining a verification result for the virtual avatar based on a subset in the first similarity set that is associated with the plurality of candidate images, and the second similarity set; and
   generating a non-fungible token for the virtual avatar based on the verification result;
   wherein determining a verification result for the virtual avatar comprises:
   merging the subset and the second similarity set to obtain a third similarity set;
   determining the verification result to be normal in response to absence of a similarity in the third similarity set that exceeds a threshold value; and
   determining the verification result to be abnormal in response to presence of a similarity in the third similarity set that exceeds the threshold value.

2. The method according to claim 1, wherein determining the first similarity set comprising the plurality of similarities between the virtual avatar and the plurality of reference images comprises:
   extracting a facial region in the virtual avatar;
   extracting target features of the facial region of the virtual avatar;
   extracting a plurality of reference facial regions in the plurality of reference images; and
   extracting a plurality of reference features of the plurality of reference facial regions of the plurality of reference images.

3. The method according to claim 2, further comprising:
   determining the plurality of similarities between the virtual avatar and the plurality of reference images based on the target features and the plurality of reference features;
   ranking the plurality of similarities between the virtual avatar and the plurality of reference images;
   selecting the predetermined number of similarities based on said ranking; and
   wherein selecting a plurality of candidate images from the plurality of reference images based on the first similarity set and a predetermined number comprises:
   determining a plurality of reference images corresponding to the selected predetermined number of similarities as the plurality of candidate images.

4. The method according to claim 3, wherein selecting the predetermined number of similarities based on said ranking comprises:
   dividing the plurality of reference features into a plurality of sub-vectors, wherein each sub-vector has a corresponding one of a plurality of sub-spaces;
   generating corresponding sub-codebooks based on the plurality of sub-spaces;
   mapping the plurality of sub-vectors to codewords in the corresponding sub-codebooks; and
   determining the plurality of similarities between the virtual avatar and the plurality of reference images based on distances between the codewords and a plurality of codewords for the plurality of candidate images.

5. The method according to claim 2, further comprising:
   storing the target features and the plurality of reference features to a data storage apparatus.

6. The method according to claim 1, wherein determining a second similarity set comprising a plurality of similarities between the virtual avatar and the plurality of candidate images comprises:
   determining the plurality of similarities between the virtual avatar and the plurality of candidate images via a predetermined face matcher, wherein the face matcher has a matching algorithm different from a similarity algorithm for determining the first similarity set; and
   determining the plurality of similarities between the virtual avatar and the plurality of candidate images as the second similarity set.

7. The method according to claim 1, wherein merging the subset and the second similarity set to obtain a third similarity set comprises at least one of:
   weighting the subset and the second similarity set based on predetermined weights;
   searching the image library based on the subset to obtain the plurality of candidate images, and ranking the plurality of candidate images based on the second similarity set;
   ranking the plurality of candidate images using the second similarity set; and
   ranking the plurality of candidate images separately based on the subset and the second similarity set, and taking an intersection of the results of the two rankings.

8. The method according to claim 1, further comprising:
   generating, in response to the result of verifying the virtual avatar being normal, the non-fungible token for the virtual avatar for use as a virtual asset of a user; or
   indicating to the user, in response to the result of verifying the virtual avatar being abnormal, a non-uniqueness of the virtual avatar.

9. The method according to claim 8, further comprising:
generating metadata for the virtual asset in response to generating the non-fungible token for the virtual avatar for use as the virtual asset of the user; and
storing the metadata into a decentralized network.

10. An electronic device, comprising:
at least one processor; and
memory coupled to the at least one processor, wherein the memory has instructions stored therein which, when executed by the at least one processor, cause the electronic device to perform actions comprising:
determining, based on a virtual avatar and a plurality of reference images in an image library, a first similarity set comprising a plurality of similarities between the virtual avatar and the plurality of reference images;
selecting a plurality of candidate images from the plurality of reference images based on the first similarity set and a predetermined number;
determining a second similarity set comprising a plurality of similarities between the virtual avatar and the plurality of candidate images;
determining a verification result for the virtual avatar based on a subset in the first similarity set that is associated with the plurality of candidate images, and the second similarity set; and
generating a non-fungible token for the virtual avatar based on the verification result;
wherein determining a verification result for the virtual avatar comprises:
merging the subset and the second similarity set to obtain a third similarity set;
determining the verification result to be normal in response to absence of a similarity in the third similarity set that exceeds a threshold value; and
determining the verification result to be abnormal in response to presence of a similarity in the third similarity set that exceeds the threshold value.

11. The electronic device according to claim 10, wherein determining a second similarity set comprising a plurality of similarities between the virtual avatar and the plurality of candidate images comprises:
extracting a facial region in the virtual avatar;
extracting target features of the facial region of the virtual avatar;
extracting a plurality of reference facial regions in the plurality of reference images; and
extracting a plurality of reference features of the plurality of reference facial regions of the plurality of reference images.

12. The electronic device according to claim 11, wherein the actions further comprise:
determining the plurality of similarities between the virtual avatar and the plurality of reference images based on the target features and the plurality of reference features;
ranking the plurality of similarities between the virtual avatar and the plurality of reference images;
selecting the predetermined number of similarities based on said ranking; and
wherein the action of selecting a plurality of candidate images from the plurality of reference images based on the first similarity set and a predetermined number comprises:
determining a plurality of reference images corresponding to the selected predetermined number of similarities as the plurality of candidate images.

13. The electronic device according to claim 12, wherein selecting the predetermined number of similarities based on said ranking comprises:
dividing the plurality of reference features into a plurality of sub-vectors, wherein each sub-vector has a corresponding one of a plurality of sub-spaces;
generating corresponding sub-codebooks based on the plurality of sub-spaces;
mapping the plurality of sub-vectors to codewords in the corresponding sub-codebooks; and
determining the plurality of similarities between the virtual avatar and the plurality of reference images based on distances between the codewords and a plurality of codewords for the plurality of candidate images.

14. The electronic device according to claim 10, wherein determining a second similarity set comprising a plurality of similarities between the virtual avatar and the plurality of candidate images comprises:
determining the plurality of similarities between the virtual avatar and the plurality of candidate images via a predetermined face matcher, wherein the face matcher has a matching algorithm different from a similarity algorithm for determining the first similarity set; and
determining the plurality of similarities between the virtual avatar and the plurality of candidate images as the second similarity set.

15. The electronic device according to claim 10, wherein merging the subset and the second similarity set to obtain a third similarity set comprises at least one of:
weighting the subset and the second similarity set based on predetermined weights;
searching the image library based on the subset to obtain the plurality of candidate images, and ranking the plurality of candidate images based on the second similarity set;
ranking the plurality of candidate images using the second similarity set; and
ranking the plurality of candidate images separately based on the subset and the second similarity set, and taking an intersection of the results of the two rankings.

16. The electronic device according to claim 10, wherein the actions further comprise:
generating, in response to the result of verifying the virtual avatar being normal, the non-fungible token for the virtual avatar for use as a virtual asset of a user; or
indicating to the user, in response to the result of verifying the virtual avatar being abnormal, a non-uniqueness of the virtual avatar.

17. The electronic device according to claim 16, wherein the actions further comprise:
generating metadata for the virtual asset in response to generating the non-fungible token for the virtual avatar for use as the virtual asset of the user; and
storing the metadata into a decentralized network.

18. A computer program product that is tangibly stored on a non-transitory computer-readable medium and comprises computer-executable instructions, wherein the computer-executable instructions, when executed by a device, cause the device to perform actions comprising:
determining, based on a virtual avatar and a plurality of reference images in an image library, a first similarity set comprising a plurality of similarities between the virtual avatar and the plurality of reference images;
selecting a plurality of candidate images from the plurality of reference images based on the first similarity set and a predetermined number;

determining a second similarity set comprising a plurality of similarities between the virtual avatar and the plurality of candidate images;

determining a verification result for the virtual avatar based on a subset in the first similarity set that is associated with the plurality of candidate images, and the second similarity set; and generating a non-fungible token for the virtual avatar based on the verification result;

wherein determining a verification result for the virtual avatar comprises:

merging the subset and the second similarity set to obtain a third similarity set;

determining the verification result to be normal in response to absence of a similarity in the third similarity set that exceeds a threshold value; and determining the verification result to be abnormal in response to presence of a similarity in the third similarity set that exceeds the threshold value.

19. The computer program product according to claim 18, wherein determining a second similarity set comprising a plurality of similarities between the virtual avatar and the plurality of candidate images comprises:

determining the plurality of similarities between the virtual avatar and the plurality of candidate images via a predetermined face matcher, wherein the face matcher has a matching algorithm different from a similarity algorithm for determining the first similarity set; and determining the plurality of similarities between the virtual avatar and the plurality of candidate images as the second similarity set.

20. The computer program product according to claim 18, wherein the actions further comprise:

generating, in response to the result of verifying the virtual avatar being normal, the non-fungible token for the virtual avatar for use as a virtual asset of a user; or indicating to the user, in response to the result of verifying the virtual avatar being abnormal, a non-uniqueness of the virtual avatar.

* * * * *